United States Patent
Zhou et al.

(10) Patent No.: US 12,185,410 B2
(45) Date of Patent: Dec. 31, 2024

(54) WAKE-UP SIGNAL DETECTION METHOD AND APPARATUS

(71) Applicant: HUAWEI TECHNOLOGIES CO., LTD., Guangdong (CN)

(72) Inventors: Han Zhou, Shanghai (CN); Yifan Xue, Beijing (CN); Xiaolei Tie, Shanghai (CN); Jian Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 374 days.

(21) Appl. No.: 17/708,704

(22) Filed: Mar. 30, 2022

(65) Prior Publication Data

US 2022/0225470 A1 Jul. 14, 2022

Related U.S. Application Data

(63) Continuation of application No. PCT/CN2019/109716, filed on Sep. 30, 2019.

(51) Int. Cl.
*H04W 52/02* (2009.01)
*H04W 76/28* (2018.01)

(52) U.S. Cl.
CPC ....... *H04W 76/28* (2018.02); *H04W 52/0229* (2013.01)

(58) Field of Classification Search
CPC .......................... H04W 76/28; H04W 52/0229
USPC ....................................................... 370/311
See application file for complete search history.

(56) References Cited

U.S. PATENT DOCUMENTS

| | | | |
|---|---|---|---|
| 2018/0145800 A1 | 5/2018 | Srivastav et al. | |
| 2018/0332533 A1 | 11/2018 | Bhattad et al. | |
| 2019/0159280 A1 | 5/2019 | Chakraborty et al. | |
| 2022/0039014 A1* | 2/2022 | Shi | H04W 52/0235 |
| 2022/0078879 A1* | 3/2022 | Nimbalker | H04W 52/0235 |

FOREIGN PATENT DOCUMENTS

| | | |
|---|---|---|
| CN | 108702707 A | 10/2018 |
| CN | 109413721 A | 3/2019 |
| CN | 109561038 A | 4/2019 |
| CN | 109923914 A | 6/2019 |
| CN | 112153724 A | 12/2020 |
| EP | 3937441 A1 | 1/2022 |
| KR | 20180121350 A | 11/2018 |
| WO | 2019158446 A1 | 8/2019 |

(Continued)

OTHER PUBLICATIONS

Intel Corporation, "Considerations on PDCCH-based power saving signal," 3GPP TSG-RAN WG1 #98, R1-1908656, Prague, CZ, Aug. 26-30, 2019, 9 pages (Year: 2019).*

(Continued)

*Primary Examiner* — Mark G. Pannell
(74) *Attorney, Agent, or Firm* — Fish & Richardson P.C.

(57) ABSTRACT

Example wake-up signal detection methods and apparatus are described. One example method includes determining, by a terminal device, N physical downlink control channel (PDCCH) monitoring occasions before an active time DRX ON. The terminal detects a wake-up signal (WUS) on M PDCCH monitoring occasions of the N PDCCH monitoring occasions, where M is less than N, and both N and M are positive integers greater than 1.

17 Claims, 6 Drawing Sheets

(56) References Cited

FOREIGN PATENT DOCUMENTS

WO      2021056546 A1     4/2021

OTHER PUBLICATIONS

3GPP TS 38.213 V15.6.0 (Jun. 2019), "3rd Generation Partnership Project; Technical Specification Group Radio Access Network; NR; Physical layer procedures for control (Release 15)," Jun. 2019, 107 pages.

3GPP TS 38.321 V0.2.0 (Aug. 2017), "3rd Generation Partnership Project; Technical Specification Group Radio Access Network; NR; Medium Access Control (MAC) protocol specification (Release 15)," Aug. 2017, 36 pages.

3GPP TS 38.331 V15.6.0 (Jun. 2019), "3rd Generation Partnership Project; Technical Specification Group Radio Access Network; NR; Radio Resource Control (RRC); Protocol specification (Release 15)," Jun. 2019, 519 pages.

CATT, "Summary of PDCCH-based Power Saving Signal/Channel," 3GPP TSG RAN WG1 #97, R1-1907711, Reno, China, May 13-17, 2019, 8 pages.

Huawei et al., "PDCCH-based power saving signal/channel," 3GPP TSG RAN WG1 Meeting #97, R1-1906005, Reno, USA, May 13-17, 2019, 10 pages.

PCT International Search Report and Written Opinion issued in International Application No. PCT/CN2019/109716 on Jun. 23, 2020, 13 pages (with English translation).

Extended European Search Report issued in European Application No. 19947863.7 on Aug. 25, 2022, 8 pages.

Vivo, "PDCCH-Based Power Saving Signal/Channel," 3GPP TSG RAN WG1 #97, R1-1906170, Reno, USA, May 13-17, 2019, 10 pages.

LG Electronics, "Discussion on wake up signal configurations and procedures," 3GPP TSG RAN WG1 Meeting #92, R1-1802166, Athens, Greece, Feb. 26-Mar. 2, 2018, 8 pages.

Intel Corporation, "Considerations on PDCCH-based power saving signal," 3GPP TSG-RAN WG1 #98, R1-1908656, Prague, CZ, Aug. 26-30, 2019, 9 pages.

Office Action in Japanese Appln. No. 2022-519765, mailed on May 8, 2023, 7 pages (with English translation).

Office Action in Indian Appln. No. 202237022097, mailed on Apr. 30, 2024, 3 pages (with English translation).

\* cited by examiner

WAKE-UP SIGNAL DETECTION METHOD AND APPARATUS

CROSS-REFERENCE TO RELATED APPLICATIONS

This application is a continuation of International Application No. PCT/CN2019/109716, filed on Sep. 30, 2019. The disclosure of which is hereby incorporated by reference in its entirety.

TECHNICAL FIELD

This application relates to the field of wireless communications technologies, and in particular, to a wake-up signal detection method and an apparatus.

BACKGROUND

In a 5th generation (5th generation, 5G) new radio (new radio, NR) system, a wake-up signal (wake-up signal, WUS) based on a physical downlink control channel (physical downlink control channel, PDCCH) may be introduced. In other words, the WUS signal may reuse an existing PDCCH, and a terminal device obtains, by detecting a corresponding PDCCH, a WUS signal sent by a network device. In addition, the WUS signal may be combined with a discontinuous reception (discontinuous reception, DRX) mechanism in a radio resource control (radio resource control, RRC) connected state. For a terminal device that supports the WUS signal, the network device may send the WUS signal to the terminal device in a DRX form.

The WUS signal based on the PDCCH is sent in a predefined search space set (search space set), the search space set has a preconfigured bandwidth and a preconfigured sending cycle on a time-frequency resource, and the sending cycle of the search space set may include 1 to 2560 slots. In a sending cycle of a search space set, one or more consecutive slots may be used to send a PDCCH. In a slot in which the PDCCH is sent, the PDCCH may occupy one to three symbols in the slot. These symbols are referred to as a PDCCH monitoring occasion (PDCCH monitoring occasion). The network device may configure a slot for sending a PDCCH in a sending cycle of a search space set, and a specific symbol position of a PDCCH in each slot for sending the PDCCH.

For a terminal device in a DRX state, a period of time before an active time DRX ON may be specified as a receive time window of the WUS signal, and the terminal device detects the WUS signal on a PDCCH monitoring occasion in the receive time window. If the WUS signal is detected in the receive time window, the terminal device needs to wake up in the corresponding DRX ON. If the terminal device does not detect the WUS signal in the receive time window, the terminal device may continue to sleep in the corresponding DRX ON.

Configuration of the receive time window depends only on a time length of the receive time window and a time offset that is of the receive time window and that is relative to the DRX ON, and is independent of the sending cycle of the search space set. Therefore, a receive time window of a WUS signal may include sending cycles of a plurality of search space sets, so that there are relatively many PDCCH monitoring occasions included in the receive time window. If the terminal device detects the WUS signal on all PDCCH monitoring occasions in the receive time window, relatively large power consumption is caused, and a power saving gain is reduced.

SUMMARY

Embodiments of this application provide a wake-up signal detection method and an apparatus, to reduce power consumption of detecting a WUS signal by a terminal device.

According to a first aspect, an embodiment of this application provides a wake-up signal detection method. The method may be performed by a terminal device, or may be performed by an apparatus (for example, a processor and/or a chip) in a terminal device, and the method includes: The terminal device determines N physical downlink control channel PDCCH monitoring occasions before an active time DRX ON; and the terminal device detects a wake-up signal WUS on M of the N PDCCH monitoring occasions, where M is less than N, and both N and M are positive integers greater than 1.

According to the technical solution provided in this application, the terminal device may detect the WUS signal on some of the N PDCCH monitoring occasions before the active time DRX ON, thereby effectively reducing power consumption of the terminal device and increasing a power saving gain.

With reference to the first aspect, in a possible design of the first aspect, the M PDCCH monitoring occasions are M PDCCH monitoring occasions closest to the DRX ON in the N PDCCH monitoring occasions. In this way, a time in which the terminal device wakes up and detects the WUS signal before the wake-up time DRX ON can be minimized, thereby effectively reducing the power consumption of the terminal device and increasing the power saving gain.

Alternatively, the M PDCCH monitoring occasions are M PDCCH monitoring occasions farthest from the DRX ON in the N PDCCH monitoring occasions. In this way, a possibility that the terminal device misses detecting the WUS signal can be effectively reduced, and a scheduling delay caused by missing detection of the WUS signal can be reduced.

With reference to the first aspect, in a possible design of the first aspect, if the M PDCCH monitoring occasions are M PDCCH monitoring occasions farthest from the DRX ON in the N PDCCH monitoring occasions, and the terminal device does not detect the WUS on the M PDCCH monitoring occasions, the terminal device continues to detect the WUS on remaining N-M PDCCH monitoring occasions until the WUS is detected or the detection on the remaining N-M PDCCH monitoring occasions is completed PDCCH monitoring occasion.

With reference to the first aspect, in a possible design of the first aspect, the terminal device may determine, according to a preset mapping rule, the M PDCCH monitoring occasions from the N PDCCH monitoring occasions, where the preset mapping rule is used to determine PDCCH monitoring occasion whether to detect the WUS on each of the N PDCCH monitoring occasions. In this way, flexibility of detecting, by the terminal device, the WUS signal on the M PDCCH monitoring occasions can be effectively improved.

With reference to the first aspect, in a possible design of the first aspect, the mapping rule satisfies the following relationship:

$$f = (UE_{id}\text{-index}) \bmod(X)$$

where $UE_{id}$ is an identifier of the terminal device or a terminal device group to which the terminal device belongs, index is a sequence number of the PDCCH monitoring occasion, mod indicates a modulo operation, X is a detection interval, and f is a real number; and when a value of f is 0, it indicates that the terminal device needs to detect the WUS on the PDCCH monitoring occasion, or when a value of f is not 0, it indicates that the terminal device does not need to detect the WUS on the PDCCH monitoring occasion.

It can be learned that the terminal device determines, according to this mapping rule, the M PDCCH monitoring occasions on which detection needs to be performed, so that M PDCCH monitoring occasions corresponding to different terminal devices are randomized in different slots. This avoids that WUS signals of a relatively large quantity of terminal devices need to be sent in a same slot, so that occupation of downlink air interface resources of a network device is more balanced.

With reference to the first aspect, in a possible design of the first aspect, the terminal device may receive first indication information from a network device, where the first indication information is used to indicate the terminal device to detect the WUS on M of the N PDCCH monitoring occasions.

With reference to the first aspect, in a possible design of the first aspect, the N PDCCH monitoring occasions are N PDCCH monitoring occasions in a receive time window of the WUS. The terminal device may determine the receive time window of the WUS in the following manner: The terminal device determines the receive time window based on an offset between an end time of the receive time window and a start time of the DRX ON and a length of the receive time window. Alternatively, the terminal device determines the receive time window based on an offset between an end time of the receive time window and a start time of the DRX ON and an offset between a start time of the receive time window and the start time of the DRX ON.

With reference to the first aspect, in a possible design of the first aspect, the terminal device may determine the N PDCCH monitoring occasions included in the receive time window in the following manner: The terminal device determines, based on the receive time window and a configuration parameter of the PDCCH monitoring occasion, the N PDCCH monitoring occasions included in the receive time window. The configuration parameter of the PDCCH monitoring occasion is used to indicate one or more of the following information: a sending cycle of a search space set, a start slot for sending the PDCCH monitoring occasion in a sending cycle of each search space set, a quantity of slots for consecutively sending the PDCCH monitoring occasion in the sending cycle of each search space set, a start symbol for sending the PDCCH monitoring occasion in each slot for sending the PDCCH monitoring occasion, or a quantity of symbols for consecutively sending the PDCCH monitoring occasion in each slot for sending the PDCCH monitoring occasion.

According to a second aspect, an embodiment of this application provides a wake-up signal detection method. The method may be performed by a network device, or may be performed by an apparatus (for example, a processor and/or a chip) in a network device, and the method includes: The network device determines N physical downlink control channel PDCCH monitoring occasions before an active time DRX ON; and the network device sends first indication information to a terminal device, where the first indication information is used to indicate the terminal device to detect a wake-up signal WUS on M of the N PDCCH monitoring occasions, where M is less than N, and both N and M are positive integers greater than 1.

According to the technical solution provided in this application, the network device configures the terminal device to detect the WUS signal on some of the N PDCCH monitoring occasions before the active time DRX ON. This may effectively reduce power consumption of the terminal device and increase a power saving gain.

With reference to the second aspect, in a possible design of the second aspect, the M PDCCH monitoring occasions are M PDCCH monitoring occasions closest to the DRX ON in the N PDCCH monitoring occasions. In this way, a time in which the terminal device wakes up and detects the WUS signal before the wake-up time DRX ON can be minimized, thereby effectively reducing the power consumption of the terminal device and increasing the power saving gain.

Alternatively, the M PDCCH monitoring occasions are M PDCCH monitoring occasions farthest from the DRX ON in the N PDCCH monitoring occasions. In this way, a possibility that the terminal device misses detecting the WUS signal can be effectively reduced, and a scheduling delay caused by missing detection of the WUS signal can be reduced.

With reference to the second aspect, in a possible design of the second aspect, the network device may determine, according to a preset mapping rule, the M PDCCH monitoring occasions from the N PDCCH monitoring occasions, where the preset mapping rule is used to determine PDCCH monitoring occasion whether the terminal device needs to detect the WUS on each of the N PDCCH monitoring occasions. In this way, flexibility of detecting, by the terminal device, the WUS signal on the M PDCCH monitoring occasions can be effectively improved.

With reference to the second aspect, in a possible design of the second aspect, the mapping rule satisfies the following relationship:

$$f=(UE_{id}\text{-index})\mathrm{mod}(X)$$

where $UE_{id}$ is an identifier of the terminal device or a terminal device group, index is a sequence number of the PDCCH monitoring occasion, mod indicates a modulo operation, X is a detection interval, and f is a real number; and when a value of f is 0, it indicates that the terminal device needs to detect the WUS on the PDCCH monitoring occasion, or when a value of f is not 0, it indicates that the terminal device does not need to detect the WUS on the PDCCH monitoring occasion.

It can be learned that the network device determines, according to this mapping rule, the M PDCCH monitoring occasions on which detection needs to be performed by the terminal device, so that M PDCCH monitoring occasions corresponding to different terminal devices are randomized in different slots. This avoids that WUS signals of a relatively large quantity of terminal devices need to be sent in a same slot, so that occupation of downlink air interface resources of the network device is more balanced.

With reference to the second aspect, in a possible design of the second aspect, the network device may send second indication information to the terminal device, where the second indication information is used to indicate a configuration parameter of a receive time window of the WUS. The configuration parameter of the receive time window includes an offset between an end time of the receive time window and a start time of the DRX ON and a length of the receive time window, or the configuration parameter of the receive time window includes an offset between an end time of the receive time window and a start time of the DRX ON and an offset between a start time of the receive time window and the start time of the DRX ON.

With reference to the second aspect, in a possible design of the second aspect, the network device may send third indication information to the terminal device, where the third indication information is used to indicate a configuration parameter of the PDCCH monitoring occasion, and the configuration parameter of the PDCCH monitoring occasion includes one or more of the following information: a sending cycle of a search space set, a start slot for sending the PDCCH monitoring occasion in a sending cycle of each search space set, a quantity of slots for consecutively sending the PDCCH monitoring occasion in the sending cycle of each search space set, a start symbol for sending the PDCCH monitoring occasion in each slot for sending the PDCCH monitoring occasion, or a quantity of symbols for consecutively sending the PDCCH monitoring occasion in each slot for sending the PDCCH monitoring occasion.

According to a third aspect, an embodiment of this application provides a communications apparatus. The apparatus has a function of implementing the terminal device in any one of the first aspect or the possible designs of the first aspect. The apparatus may be a terminal device, for example, a handheld terminal device, a vehicle-mounted terminal device, vehicle user equipment, or a road side unit, or may be an apparatus included in a terminal device, for example, a chip, or may be an apparatus including a terminal device. The function of the foregoing terminal device may be implemented by hardware, or may be implemented by hardware by executing corresponding software. The hardware or the software includes one or more modules corresponding to the foregoing function.

The communications apparatus may also have a function of implementing the network device in any one of the second aspect or the possible designs of the second aspect. The communications apparatus may be a network device, for example, a base station, or may be an apparatus included in a network device, for example, a chip. The function of the foregoing network device may be implemented by hardware, or may be implemented by hardware by executing corresponding software. The hardware or the software includes one or more modules corresponding to the foregoing function.

In a possible design, a structure of the apparatus includes a processing module and a transceiver module. The processing module is configured to support the apparatus in performing a corresponding function of the terminal device in any one of the first aspect or the designs of the first aspect. The transceiver module is configured to support communication between the apparatus and another communications device. For example, when the apparatus is a terminal device, the apparatus may receive a wake-up signal WUS from a network device. The communications apparatus may further include a storage module. The storage module is coupled to the processing module, and stores a program instruction and data that are necessary for the apparatus. In an example, the processing module may be a processor, the transceiver module may be a transceiver, and the storage module may be a memory. The memory may be integrated with the processor, or may be disposed separately from the processor. This is not limited in this application.

In another possible design, a structure of the apparatus includes a processor, and may further include a memory. The processor is coupled to the memory, and may be configured to execute a computer program instruction stored in the memory, so that the apparatus performs the method in any one of the first aspect or the possible designs of the first aspect. Optionally, the apparatus further includes a communications interface, and the processor is coupled to the communications interface. When the apparatus is a terminal device, the communications interface may be a transceiver or an input/output interface. When the apparatus is a chip included in a terminal device, the communications interface may be an input/output interface of the chip. Optionally, the transceiver may be a transceiver circuit, and the input/output interface may be an input/output circuit.

According to a fourth aspect, an embodiment of this application provides a chip system. The chip system includes a processor, where the processor is coupled to a memory, the memory is configured to store a program or an instruction, and when the program or the instruction is executed by the processor, the chip system is enabled to implement the method in any one of the first aspect or the possible designs of the first aspect, or implement the method in any one of the second aspect or the possible designs of the second aspect.

Optionally, the chip system further includes an interface circuit, and the interface circuit is configured to receive a code instruction and transmit the code instruction to the processor.

Optionally, there may be one or more processors in the chip system, and the processor may be implemented by hardware or may be implemented by software. When the processor is implemented by using hardware, the processor may be a logic circuit, an integrated circuit, or the like. When the processor is implemented by using software, the processor may be a general-purpose processor, and is implemented by reading software code stored in the memory.

Optionally, there may be one or more memories in the chip system. The memory may be integrated with the processor, or may be disposed separately from the processor. This is not limited in this application. For example, the memory may be a non-transitory processor, for example, a read-only memory ROM. The memory and the processor may be integrated into a same chip, or may be separately disposed on different chips. A type of the memory and a manner of disposing the memory and the processor are not specifically limited in this application.

According to a fifth aspect, an embodiment of this application provides a readable storage medium. The readable storage medium stores a computer program or an instruction, and when the computer program or the instruction is executed, a computer is enabled to perform the method in any one of the first aspect or the possible designs of the first aspect, or perform the method in any one of the second aspect or the possible designs of the second aspect.

According to a sixth aspect, an embodiment of this application provides a computer program product. When a computer reads and executes the computer program product, the computer is enabled to perform the method in any one of the first aspect or the possible designs of the first aspect, or perform the method in any one of the second aspect or the possible designs of the second aspect.

According to a seventh aspect, an embodiment of this application provides a communications system. The communications system includes a network device and at least one terminal device.

DESCRIPTION OF EMBODIMENTS

To make the objectives, the technical solutions and the advantages of the embodiments of this application clearer, the following further describes the embodiments of this application in detail with reference to the accompanying drawings.

The technical solutions of the embodiments of this application may be used in various communications systems, such as a global system for mobile communications (global system for mobile communications, GSM) system, a code division multiple access (code division multiple access, CDMA) system, a wideband code division multiple access (wideband code division multiple access, WCDMA) system, a general packet radio service (general packet radio service, GPRS) system, a long term evolution (long term evolution, LTE) system, an LTE frequency division duplex (frequency division duplex, FDD) system, an LTE time division duplex (time division duplex, TDD) system, a universal mobile telecommunications system (universal mobile telecommunication system, UMTS), a worldwide interoperability for microwave access (worldwide interoperability for microwave access, WIMAX) communications system, and a 5th generation (5th generation, 5G) system or a new radio (new radio, NR) system, or is used in a future communications system or another similar communications system.

The technical solutions in the embodiments of this application may be used in technical fields such as unmanned driving (unmanned driving), assisted driving (assisted driving, ADAS), intelligent driving (intelligent driving), connected driving (connected driving), intelligent network driving (Intelligent network driving), car sharing (car sharing), a smart/intelligent car (smart/intelligent car), a digital car (digital car), an unmanned car (unmanned car/driverless car/pilotless car/automobile), the internet of vehicles (Internet of vehicles, IoV), a self-driving car (self-driving car/autonomous car), cooperative vehicle infrastructure (cooperative vehicle infrastructure, CVIS), intelligent transportation system (intelligent transportation system, ITS), and vehicle-mounted communication (vehicle-mounted communication).

Figure 1:
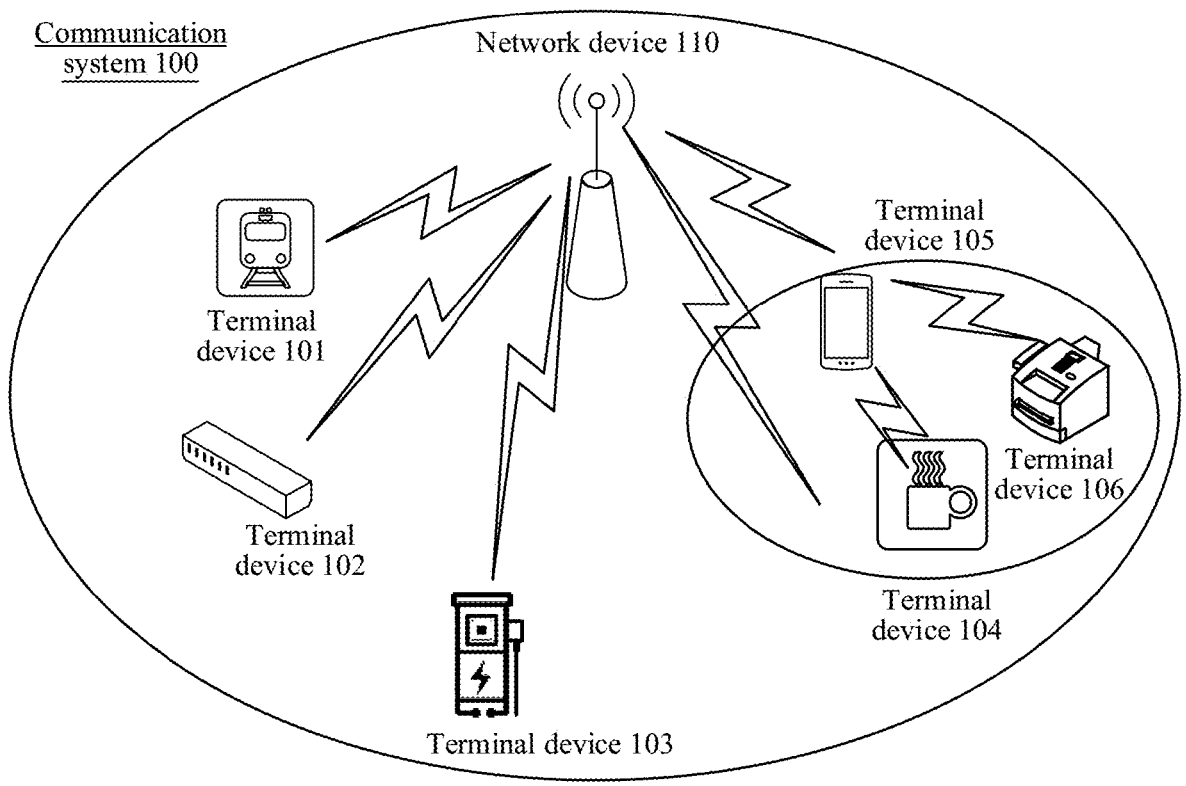
FIG. 1 is a schematic diagram of a network architecture of a communications system to which an embodiment of this application is applicable.

FIG. 1 is a schematic diagram of a network architecture of a communications system to which an embodiment of this application is applicable. The communications system includes a network device 110, a terminal device 101, a terminal device 102, a terminal device 103, a terminal device 104, a terminal device 105, and a terminal device 106. The network device may communicate with at least one terminal device (for example, the terminal device 101) through an uplink (uplink, UL) and a downlink (downlink, DL).

The network device in FIG. 1 may be an access network device, for example, a base station. The access network device corresponds to different devices in different systems. For example, the access network device may correspond to an eNB in a fourth generation mobile communication technology (the 4$^{th}$ generation, 4G) system, and correspond to a 5G access network device, for example, a gNB, in a 5G system. The technical solutions provided in the embodiments of this application may also be used in a future mobile communications system, for example, a 6G or 7G communications system. Therefore, the network device in FIG. 1 may also correspond to an access network device in the future mobile communications system.

It should be understood that there may be a plurality of network devices in the communications system, and each network device may provide a service for a plurality of terminal devices. A quantity of network devices and a quantity of terminal devices in the communications system are not limited in the embodiments of this application. The network device in FIG. 1 and each of some or all of the plurality of terminal devices may implement the technical solutions provided in the embodiments of this application. In addition, the terminal devices in FIG. 1 may be different types of terminal devices, for example, may include terminal devices in massive machine type communication (massive machine type communication, mMTC), such as a mobile phone, and a smart water meter and an electricity meter in the internet of things. The various types of terminal devices shown in FIG. 1 are merely some examples. It should also be understood that the terminal device in the embodiments of this application is not limited thereto.

In the following, some terms of the embodiments of this application are described, so as to help a person skilled in the art have a better understanding.

(1) Terminal device: The terminal device may also be referred to as user equipment (user equipment, UE), a mobile station (mobile station, MS), a mobile terminal (mobile terminal, MT), or the like, and is a device that provides voice and/or data connectivity for a user. The terminal device may communicate with a core network through a radio access network (radio access network, RAN), and exchange a voice and/or data with the RAN. For example, the terminal device may be a handheld device, a vehicle-mounted device, vehicle user equipment, or the like that has a wireless connection function. Currently, for example, the terminal device is a mobile phone (mobile phone), a tablet computer, a notebook computer, a palmtop, a mobile internet device (mobile internet device, MID), a wearable device, a virtual reality (virtual reality, VR) device, an augmented reality (augmented reality, AR) device, a wireless terminal in industrial control (industrial control), a wireless terminal in self-driving (self-driving), a wireless terminal in a remote surgery (remote surgery), a wireless terminal in a smart grid (smart grid), a wireless terminal in transportation safety (transportation safety), a wireless terminal in a smart city (smart city), or a wireless terminal in a smart home (smart home).

As an example instead of a limitation, the terminal device in the embodiments of this application may alternatively be a wearable device. The wearable device may also be referred to as a wearable intelligent device, an intelligent wearable device, or the like, and is a general term for wearable devices that are developed by applying a wearable technology to perform intelligent design on daily wear, for example, glasses, gloves, a watch, clothes, and shoes. The wearable device is a portable device that is directly worn on a body or integrated into clothes or an accessory of a user. The wearable device is not only a hardware device, but also implements a powerful function through software support, data exchange, and cloud interaction. In a broad sense, the wearable intelligent device includes a full-featured and large-sized device, for example, a smart watch or smart glasses, that can implement complete or partial functions without depending on a smartphone, and includes a device, for example, various smart bands, smart helmets, or smart jewelry for monitoring physical signs, that focuses on only one type of application function and needs to collaboratively work with another device such as a smartphone.

The terminal device in the embodiments of this application may alternatively be a vehicle-mounted module, a vehicle-mounted component, a vehicle-mounted chip, or a vehicle-mounted unit that is built in a vehicle as one or more components or units. The vehicle uses the vehicle-mounted module, the vehicle-mounted module, the vehicle-mounted component, the vehicle-mounted chip, or the vehicle-mounted unit that is built in the vehicle, to implement the method in this application.

(2) Network device: The network device is a device that is in a network and that is configured to connect the terminal device to a wireless network. The network device may be a node in the radio access network, and may also be referred to as a base station, or may be referred to as a radio access network (radio access network, RAN) node (or device). The network device may be configured to mutually convert a received over-the-air frame and an Internet Protocol (IP) packet and serve as a router between the terminal device and a rest portion of the access network, where the rest portion of the access network may include an IP network. The network device may further coordinate attribute management of an air interface. For example, the network device may include a long term evolution (long term evolution, LTE) system or an evolved NodeB (NodeB, eNB, or e-NodeB, evolved NodeB) in an LTE-Advanced system (LTE-Advanced, LTE-A), for example, a conventional macro base station eNB and a micro base station eNB in a heterogeneous network scenario; or may include a next generation NodeB (next generation NodeB, gNB) in a 5th generation (5th generation, 5G) new radio (new radio, NR) system; or may further include a transmission reception point (transmission reception point, TRP), a home base station (for example, a home evolved NodeB, or a home NodeB, HNB), a baseband unit (baseband unit, BBU), a baseband pooll, a Wi-Fi access point (access point, AP), or the like; or may further include a centralized unit (centralized unit, CU) and a distributed unit (distributed unit, DU) in a cloud radio access network (cloud radio access network, CloudRAN) system. This is not limited in the embodiments of this application. For another example, a network device in a V2X technology is a road side unit (road side unit, RSU). The RSU may be a fixed infrastructure entity supporting a V2X application, and may exchange a message with another entity supporting the V2X application.

(3) Downlink control channel: The downlink control channel may be, for example, a PDCCH or an enhanced physical downlink control channel (enhanced physical downlink control channel, EPDCCH), or may include another downlink control channel. There is no specific limitation.

(4) The terms "system" and "network" may be used interchangeably in the embodiments of this application. "A plurality of" means two or more. In view of this, "a plurality of" may also be understood as "at least two" in the embodiments of this application. "At least one" may be understood as one or more, for example, understood as one, two, or more. For example, "include at least one" means including one, two, or more, and does not limit which items are included. For example, if at least one of A, B, and C is included, A, B, C, A and B, A and C, B and C, or A and B and C may be included. Similarly, understanding of descriptions such as "at least one type" is similar. The term "and/or" describes an association relationship for describing associated objects and represents that three relationships may exist. For example, A and/or B may represent the following three cases: Only A exists, both A and B exist, and only B exists. In addition, unless otherwise specified, the character "/" generally indicates an "or" relationship between the associated objects.

Unless otherwise stated, ordinal numbers such as "first" and "second" in the embodiments of this application are used to distinguish between a plurality of objects, but are not intended to limit a sequence, a time sequence, priorities, or importance of the plurality of objects. In addition, descriptions of "first" and "second" do not necessarily limit that the objects are different.

Figure 2:
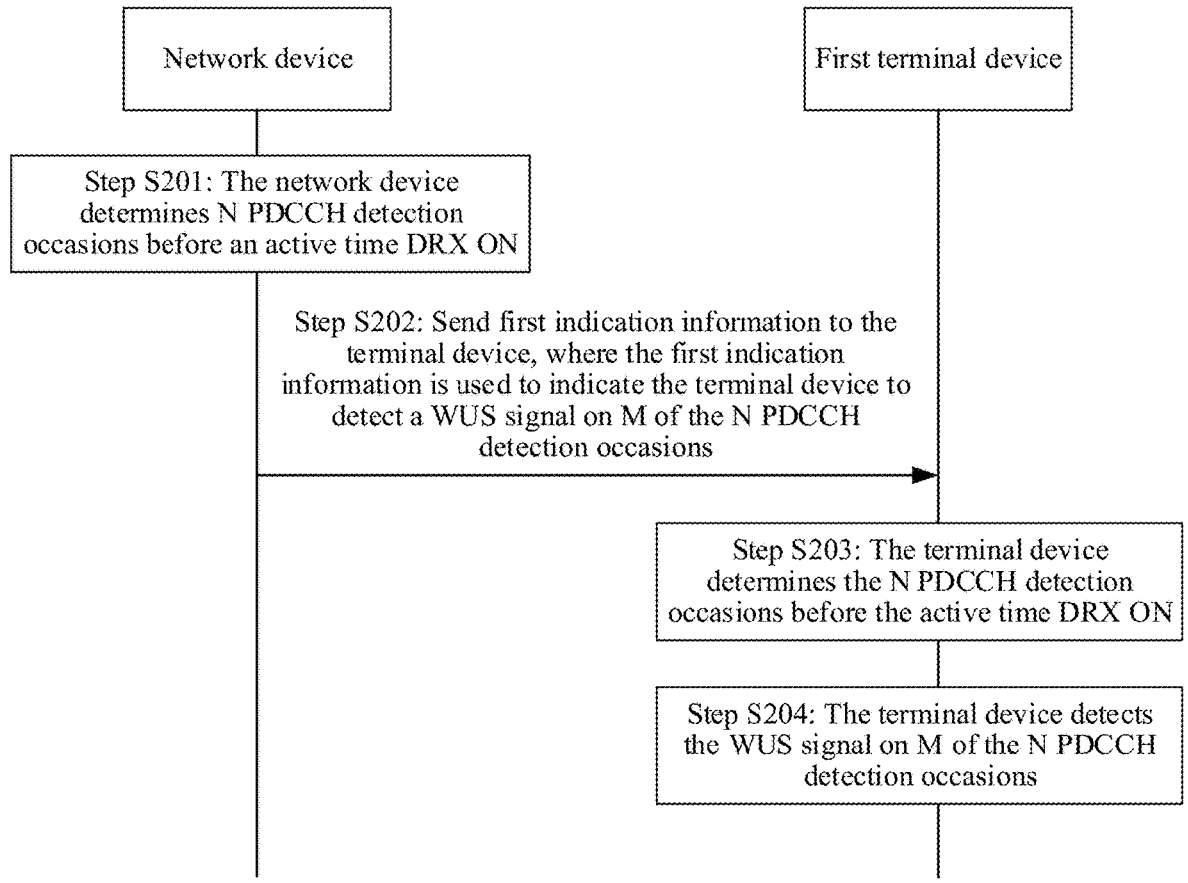
FIG. 2 is a schematic flowchart of a wake-up signal detection method according to an embodiment of this application.

FIG. 2 is a schematic flowchart of a wake-up signal detection method according to an embodiment of this application. The method specifically includes the following step S201 to step S204.

Step S201: A network device determines N PDCCH monitoring occasions before an active time DRX ON.

Step S202: The network device sends first indication information to a terminal device, where the first indication information is used to indicate the terminal device to detect a WUS signal on M of the N PDCCH monitoring occasions, where M is less than N, and both N and M are positive integers greater than 1.

Step S203: The terminal device determines the N PDCCH monitoring occasions before the active time DRX ON.

Step S204: The terminal device detects the WUS signal on M of the N PDCCH monitoring occasions.

Figure 3:
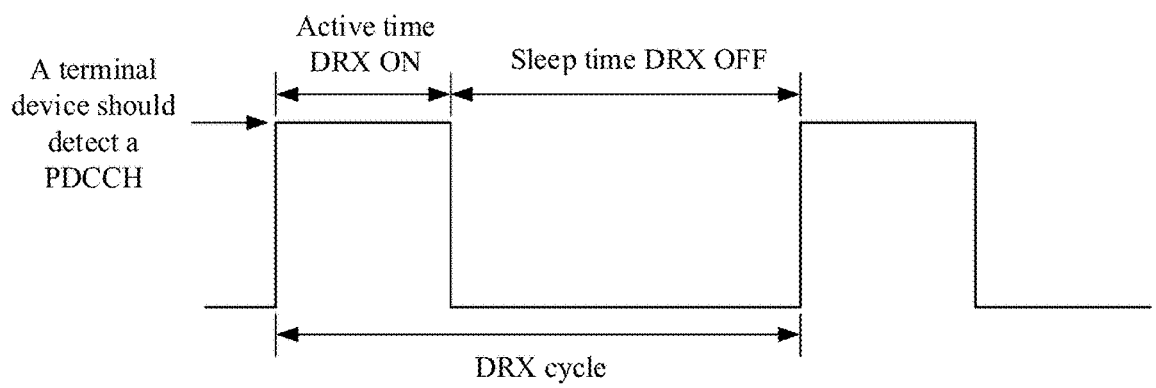
FIG. 3 is a schematic diagram of a DRX cycle and an active time DRX ON according to an embodiment of this application.

In this embodiment of this application, the terminal device is a terminal device in an RRC connected mode. Optionally, the terminal device is a terminal device for which a power saving function is configured or a power saving function is activated. The network device may configure a DRX processing procedure for the terminal device. As shown in FIG. 3, in a DRX mechanism, time is divided into DRX cycles (DRX cycle), and the terminal device enables an on duration timer (drx-on Duration Timer) at a time start position of each DRX cycle. In a running time range of the on duration timer, the terminal device continuously attempts to detect a PDCCH. If the terminal device detects the PDCCH in the running time range of the on duration timer, the terminal device enables an inactivity timer (drx-Inactivity Timer). If the terminal device continues to detect the PDCCH in the running time range of the inactivity timer, the terminal device resets the inactivity timer and starts counting again. If the inactivity timer is running, even if an originally configured on duration timer expires, the terminal device still needs to continue to detect the PDCCH until the inactivity timer expires. As long as either of the on duration timer and the inactivity timer is running, the terminal device is in the active time, and needs to continuously detect the PDCCH. The active time may also be referred to as "DRX ON", "on duration", "active time", or an active period, or may have another name. This is not limited in this application. For clarity of description, the active time is collectively referred to as "DRX ON" in the following. That the terminal device is in the active time may also be understood as that the terminal device is in an active state or in a wake-up state or enters a wake-up mode.

If the terminal device does not detect the PDCCH in the running time range of the on duration timer, after the on duration timer expires, the terminal device enters a sleep mode, that is, the terminal device is in a sleep time during the remaining time of the DRX cycle, and may disable a communications component such as a radio frequency transceiver and a baseband processor, to reduce power consumption. In this embodiment of this application, the sleep time may also be referred to as "DRX_OFF", sleep, or a sleep period, or may have another name. This is not limited in this application. That the terminal device is in the sleep time may also be understood as that the terminal device is in a sleep state or in a DRX state or enters a sleep mode. If the terminal device detects the PDCCH in the running time range of the on duration timer, the terminal device enters the sleep mode after the enabled inactivity timer expires.

Considering that data transmission is usually bursty and sparse in time, if the network device does not schedule any data for the terminal device in the active time DRX ON, unnecessary energy consumption is generated for the terminal device. To reduce power consumption, the network device may determine, based on a data scheduling requirement, whether to send the WUS signal to the terminal device before the active time DRX ON. If the terminal device does not detect the WUS signal before the active time DRX ON, or the WUS signal detected by the terminal device indicates that the terminal device has no data scheduling in the corresponding active time DRX ON, the terminal device may directly enter the sleep state, and does not need to detect the PDCCH in the active time DRX ON. If the terminal device detects the WUS signal before the active time DRX ON, or the WUS signal detected by the terminal device is used to indicate that the terminal device has data scheduling in the corresponding active time DRX ON, the terminal device needs to wake up before the active time DRX ON, and enables a timer according to the foregoing DRX mechanism, to detect the PDCCH.

In this embodiment of this application, the WUS signal is carried on the PDCCH, and the N PDCCH monitoring occasions are N PDCCH monitoring occasions, before the active time DRX ON, used to detect the WUS signal. It should be understood that the WUS signal sent by the network device may exist on a PDCCH monitoring occasion, or the WUS signal sent by the network device may not exist on a PDCCH monitoring occasion. Whether the network device sends the WUS signal on the N PDCCH monitoring occasions is determined by a plurality of factors such as whether data scheduling of the terminal device exists in the active time DRX ON, and a power saving function configured by the terminal device.

It should be noted that the WUS signal may be a WUS signal sent to a terminal device, and is referred to as a terminal-device-specific PDCCH wake-up signal (UE-specific WUS). The WUS signal may also be a WUS signal for a terminal device group, and is referred to as a terminal device group PDCCH wake-up signal (Group-based PDCCH WUS). Because one terminal device group may include a plurality of terminal devices, the terminal device mentioned in step S201 to step S204 in this embodiment of this application may be any terminal device in the terminal device group.

Figure 4:
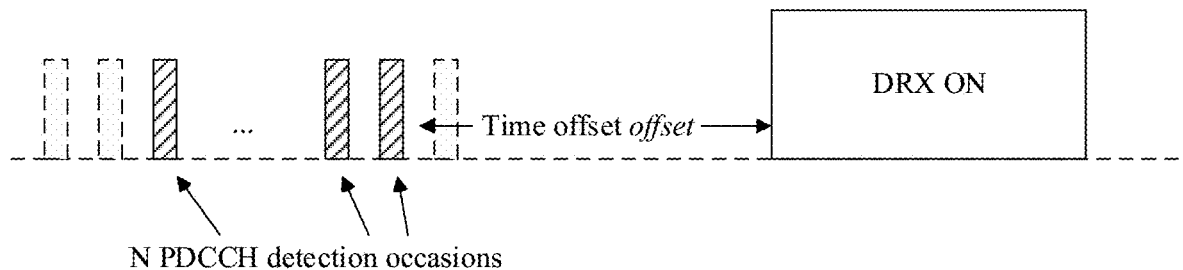
FIG. 4 is a schematic diagram of N PDCCH monitoring occasions according to an embodiment of this application.

In step S201, as shown in FIG. 4, the network device may determine N consecutive PDCCH monitoring occasions before a specific time offset from the active time DRX ON as the N PDCCH monitoring occasions. The N PDCCH monitoring occasions may be understood as that there may be a PDCCH monitoring occasion for sending the WUS signal or a valid (valid) PDCCH monitoring occasion. Correspondingly, the network device may further send second indication information and/or third indication information to the terminal device, to indicate positions of the N PDCCH monitoring occasions.

In a possible design, the second indication information may be used to indicate the value of N and the time offset, and the third indication information may be used to indicate a configuration parameter of the PDCCH monitoring occasion. The configuration parameter of the PDCCH monitoring occasion may include one or more of the following information: a sending cycle of a search space set, a start slot for sending the PDCCH monitoring occasion in a sending cycle of each search space set, a quantity of slots for consecutively sending the PDCCH monitoring occasion in the sending cycle of each search space set, a start symbol for sending the PDCCH monitoring occasion in each slot for sending the PDCCH monitoring occasion, or a quantity of symbols for consecutively sending the PDCCH monitoring occasion in each slot for sending the PDCCH monitoring occasion.

Figure 5:
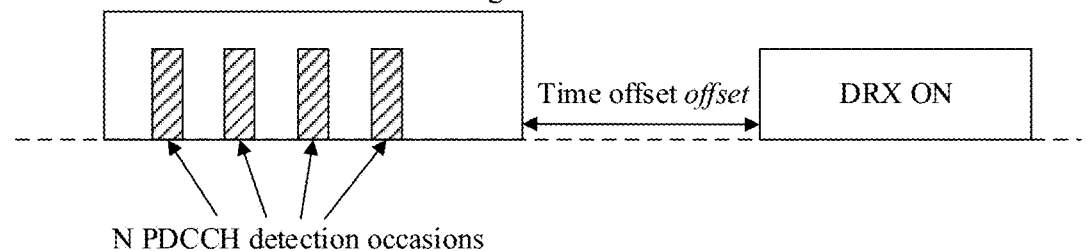
FIG. 5 is a schematic diagram of a receive time window of a WUS signal according to an embodiment of this application.

In another possible design, the N PDCCH monitoring occasions may be located in a receive time window of the WUS signal. As shown in FIG. 5, the receive time window of the WUS signal is located before the active time DRX ON, and a distance between an end time of the receive time window and a start time of the active time DRX ON is a time offset. In this embodiment of this application, the receive time window of the WUS signal may also be referred to as a search time window (WUS search window), a detection time window (WUS monitoring window), or a WUS occasion (WUS occasion). This is not limited in this application.

In this case, the network device may further send second indication information and/or third indication information to the terminal device. In this case, the second indication information is used to indicate a configuration parameter of the receive time window of the WUS signal, so that the terminal device determines a position of the receive time window of the WUS signal. The configuration parameter of the receive time window of the WUS signal may include the time offset between the end time of the receive time window and the start time of the active time DRX ON and a time length of the receive time window. Alternatively, the configuration parameter of the receive time window of the WUS signal may include the time offset between the end time of the receive time window and the start time of the active time DRX ON and a time offset between a start time of the receive time window and the start time of the active time DRX ON.

Similarly, the third indication information is used to indicate a configuration parameter of the PDCCH monitoring occasion. The configuration parameter of the PDCCH monitoring occasion may include one or more of the following information: a sending cycle of a search space set, a start slot for sending the PDCCH monitoring occasion in a sending cycle of each search space set, a quantity of slots for consecutively sending the PDCCH monitoring occasion in the sending cycle of each search space set, a start symbol for sending the PDCCH monitoring occasion in each slot for sending the PDCCH monitoring occasion, or a quantity of symbols for consecutively sending the PDCCH monitoring occasion in each slot for sending the PDCCH monitoring occasion.

It should be noted that the second indication information and the third indication information in this embodiment of this application may be sent in a plurality of manners such as higher layer signaling (for example, RRC signaling, MAC signaling, or physical layer signaling), downlink control information (downlink control information, DCI), and a system broadcast message. In addition, the second indication information and the third indication information may be sent in a same manner or different manners. This is not limited in this application. If the second indication information and the third indication information are sent in a same manner, the second indication information and the third indication information may be sent in a same message, or may be sent in different messages. This is not limited in this application either. Optionally, the network device may send the second indication information and/or the third indication information before the terminal device enters the sleep state.

In step S202, the network device may send the first indication information to the terminal device, and the first indication information is used to indicate the terminal device to detect the WUS signal on M of the N PDCCH monitoring occasions. In this embodiment of this application, both M and N are positive integers greater than 1, and M is less than or equal to N. Therefore, it may also be understood that the first indication information is used to indicate the terminal device to detect the WUS signal on some of the N PDCCH monitoring occasions. Further, it may also be understood that the first indication information is used to indicate the terminal device to detect the WUS signal on a maximum of M PDCCH monitoring occasions in the N PDCCH monitoring occasions. Because once the terminal device detects the WUS signal on any one of the M PDCCH monitoring occasions, the terminal device needs to wake up in the active time DRX ON and detect the PDCCH, and does not need to continue to detect the WUS signal.

Optionally, the network device may further indicate, in the first indication information, specific positions of the M PDCCH monitoring occasions or a preset rule for determining the M PDCCH monitoring occasions by the terminal device.

In this embodiment of this application, the first indication information may also be sent in a plurality of manners such as higher layer signaling (for example, RRC signaling, MAC signaling, or physical layer signaling), downlink control information (downlink control information, DCI), and a system broadcast message. This is not limited in this application.

It may be understood that in this embodiment of this application, the network device may send the WUS signal on some or all of the N PDCCH monitoring occasions, or may send the WUS signal on some or all of the M PDCCH monitoring occasions. For example, the network device may send the WUS signal on each of the M PDCCH monitoring occasions, and notify the terminal device of a sending manner of the WUS signal through indication information. In this way, reliability of detecting the WUS signal by the terminal device can be effectively improved, and power consumption of the terminal device can be reduced. For another example, the network device may send the WUS signal on any one or more of the M PDCCH monitoring occasions, and notify the terminal device of a sending manner of the WUS signal through indication information. In this way, resource overheads for sending the WUS signal by the network device can be effectively reduced. However, the terminal device is required to detect the M PDCCH monitoring occasions one by one.

In step S203, the terminal device may determine the N PDCCH monitoring occasions based on the second indication information and/or the third indication information received from the network device. Considering that all the third indication information in the embodiments of this application is used to indicate the configuration parameter of the PDCCH monitoring occasion, but the second indication information has a different implementation, in a possible design, as shown in FIG. 4, if the second indication information is used to indicate the value of N and the time offset, the terminal device may directly determine N PDCCH monitoring occasions before the time offset from the active time DRX ON as the N PDCCH monitoring occasions.

In another possible design, if the second indication information is used to indicate the configuration parameter of the receive time window of the WUS signal, the terminal device may determine a specific position of the receive time window of the WUS signal based on the time offset between the end time of the receive time window and the start time of the active time DRX ON and the time length of the receive time window, or the time offset between the end time of the receive time window and the start time of the active time DRX ON and the time offset between the start time of the receive time window and the start time of the active time DRX ON in the second indication information. Further, the terminal device determines the N PDCCH monitoring occasions in the receive time window of the WUS signal with reference to the configuration parameter that is of the PDCCH monitoring occasion and that is indicated in the third indication information.

In step S204, the terminal device may detect the WUS signal on M of the N PDCCH monitoring occasions.

Figure 6A:
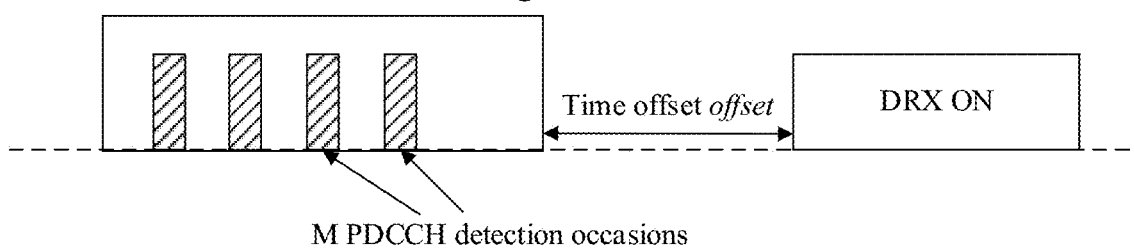
FIG. 6*a*, FIG. 6*b*, and FIG. 6*c* are schematic diagrams of M PDCCH monitoring occasions according to an embodiment of this application.

In a possible design, the M PDCCH monitoring occasions may be M PDCCH monitoring occasions closest to the active time DRX ON in the N PDCCH monitoring occasions. For example, in FIG. 6a, the receive time window of the WUS signal includes four PDCCH monitoring occasions, and if a value of M is 2, the M PDCCH monitoring occasions closest to the active time DRX ON are two rightmost PDCCH monitoring occasions in the receive time window of the WUS signal. It can be learned that the terminal device detects the WUS signal on the M PDCCH monitoring occasions that are in the receive time window of the WUS signal and that are closest to the active time DRX ON, so that a time in which the terminal device is woken up in the receive time window of the WUS signal can be minimized, thereby effectively reducing power consumption of the terminal device.

Figure 6B:
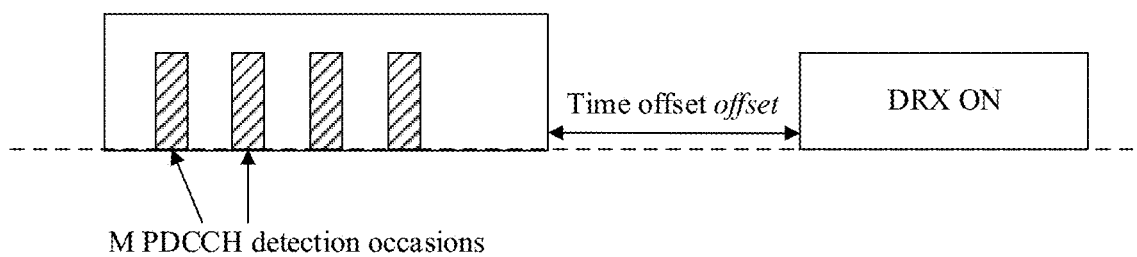

In a possible design, the M PDCCH monitoring occasions may alternatively be M PDCCH monitoring occasions farthest from the active time DRX ON in the N PDCCH monitoring occasions. For example, in FIG. 6b, the receive time window of the WUS signal includes four PDCCH monitoring occasions, and if a value of M is 2, the M PDCCH monitoring occasions farthest from the active time DRX ON are two leftmost PDCCH monitoring occasions in the receive time window of the WUS signal.

If the terminal device detects the WUS signal on the M PDCCH monitoring occasions, the terminal device may enter a micro-sleep state in a period from a time at which the terminal device detects the WUS signal to the active time DRX ON, so that power consumption is effectively reduced, and the terminal device wakes up at the active time DRX ON to detect the PDCCH. If the terminal device does not detect the WUS signal on the M PDCCH monitoring occasions, the terminal device may continue to detect the WUS signal on remaining N-M PDCCH monitoring occasions until the WUS signal is detected or the detection on the remaining N-M PDCCH monitoring occasions is completed PDCCH monitoring occasion. It can be learned that the terminal device detects the WUS signal on the M PDCCH monitoring occasions that are in the receive time window of the WUS signal and that are farthest from the active time DRX ON, so that a possibility that the terminal device misses detecting the WUS signal can be effectively reduced, and a scheduling delay caused because the terminal device does not detect the WUS signal can be reduced.

In still another possible design, the terminal device may alternatively determine, according to a preset mapping rule, the M PDCCH monitoring occasions from the N PDCCH monitoring occasions, and then detect the WUS signal on the determined M PDCCH monitoring occasions.

The preset mapping rule is used to determine, for each of the N PDCCH monitoring occasions, whether to detect the WUS signal on the PDCCH monitoring occasion. The preset mapping rule may be related to an identifier of the terminal device and a sequence number of the PDCCH monitoring occasion, and may be a function that uses the identifier of the terminal device and the sequence number of the PDCCH monitoring occasion as independent variables, that is, $f(UE_{id}, index)$. If $f(UE_{id}, index)$=true, it indicates that the WUS signal is detected on the PDCCH monitoring occasion; or if $f(UE_{id}, index)$=false, it indicates that the WUS signal is not detected on the PDCCH monitoring occasion. It may be understood that the function may further include an independent variable of one or more other parameters. This is not limited in this application.

For example, the preset mapping rule may satisfy the following relationship:

$$f=(UE_{id}\text{-index})\bmod(X) \quad \text{Formula 1}$$

where $UE_{id}$ is the identifier of the terminal device or an identifier of a terminal device group to which the terminal device belongs, index is the sequence number of the PDCCH monitoring occasion, mod indicates a modulo operation, X is a detection interval, and f is a real number; and when a value of f is 0, it indicates that the terminal device needs to detect the WUS signal on the PDCCH monitoring occasion, or when a value of f is not 0, it indicates that the terminal device does not need to detect the WUS signal on the PDCCH monitoring occasion.

Figure 6C:
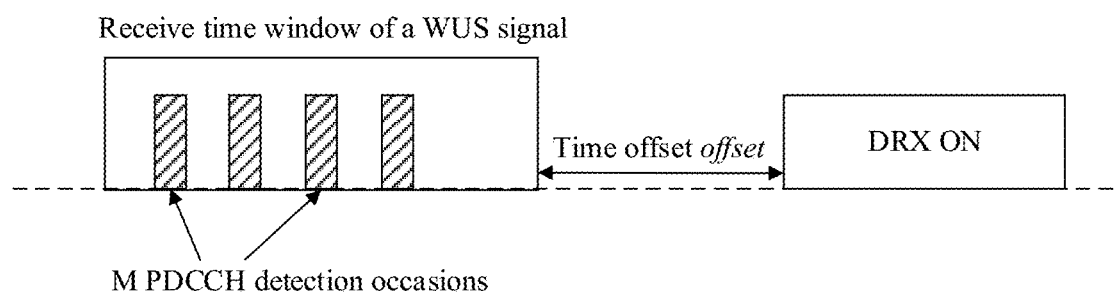

As shown in FIG. 6c, if a value of the detection interval X is 2, the terminal device detects the WUS signal once every other PDCCH monitoring occasion. It can be learned that the M PDCCH monitoring occasions, on which the WUS signal is detected, in the N PDCCH monitoring occasions are determined according to the preset mapping rule, so that M PDCCH monitoring occasions corresponding to different terminal devices are randomized in different slots. This avoids that WUS signals of a relatively large quantity of terminal devices need to be sent in a same slot, so that occupation of downlink air interface resources of the network device is more balanced.

It should be understood that, in this embodiment of this application, that the terminal device detects the WUS signal on the M PDCCH monitoring occasions may be: detecting the WUS signal on each of the M PDCCH monitoring occasions, and entering the micro-sleep state once the WUS signal is detected, to reduce power consumption. Alternatively, that the terminal device detects the WUS signal on the M PDCCH monitoring occasions may be: detecting the WUS signal on any one or more of the M PDCCH monitoring occasions. For example, if the terminal device may determine that the network device sends the WUS signal on all the M PDCCH monitoring occasions, that the terminal device detects the WUS signal on the M PDCCH monitoring occasions may be: detecting the WUS signal on any one or more of the M PDCCH monitoring occasions. Therefore, reliability of WUS signal detection can be effectively improved.

It should be noted that positions of the M PDCCH monitoring occasions in the N PDCCH monitoring occasions and the preset mapping rule used by the terminal device to determine the M PDCCH monitoring occasions in this embodiment of this application may be predefined, or may be indicated by the network device in the first indication information. "Predefine" mentioned in the embodiments of this application may be understood as "define", "predefine", "store", "pre-store", "pre-negotiate", "pre-configure", "solidify", or "pre-burn".

A sequence of performing the foregoing step S201 to step S204 is not specifically limited in this application, and the sequence of performing the steps is limited according to internal logic of the steps. For example, the network device may determine the N PDCCH monitoring occasions before the terminal device determines the N PDCCH monitoring occasions. The network device may send the first indication information to the terminal device before the terminal device detects the WUS signal on M of the N PDCCH monitoring occasions. However, the network device may send the first indication information to the terminal device before or after the terminal device determines the N PDCCH monitoring occasions. This is not limited in this application.

Figure 7:
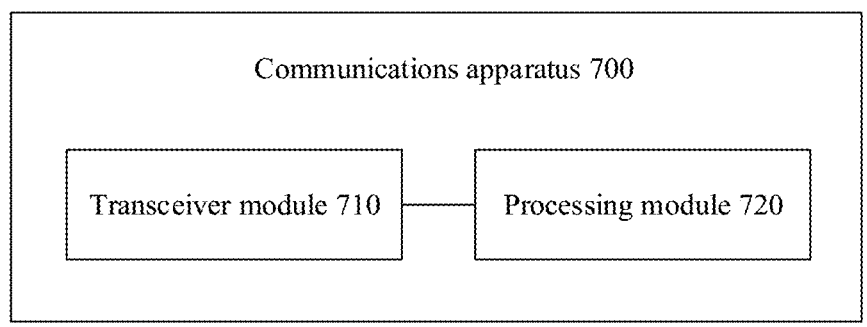
FIG. 7 is a schematic structural diagram of a communications apparatus according to an embodiment of this application.

An embodiment of this application further provides a communications apparatus. FIG. 7 is a schematic structural diagram of communications apparatus according to an embodiment of this application. A communications apparatus 700 includes a transceiver module 710 and a processing module 720. The communications apparatus may be configured to implement a function of the terminal device in any one of the foregoing method embodiments. For example, the communications apparatus may be a terminal device, for example, a handheld terminal device or a vehicle-mounted terminal device. Alternatively, the communications apparatus may be a chip included in a terminal device, or an apparatus including a terminal device, for example, various types of vehicles.

When the communications apparatus serves as a terminal device and performs the method embodiment shown in FIG. 2, the processing module 720 is configured to determine N physical downlink control channel PDCCH monitoring occasions before an active time DRX ON, and the transceiver module 710 is configured to detect a wake-up signal WUS on M of the N PDCCH monitoring occasions, where M is less than N, and both N and M are positive integers greater than 1.

In a possible design, the M PDCCH monitoring occasions are M PDCCH monitoring occasions closest to the DRX ON in the N PDCCH monitoring occasions; or the M PDCCH monitoring occasions are M PDCCH monitoring occasions farthest from the DRX ON in the N PDCCH monitoring occasions.

In a possible design, if the M PDCCH monitoring occasions are M PDCCH monitoring occasions farthest from the DRX ON in the N PDCCH monitoring occasions, and the transceiver module 710 does not detect the WUS on the M PDCCH monitoring occasions, the transceiver module 710 is further configured to: continue to detect the WUS on remaining N-M PDCCH monitoring occasions until the WUS is detected or the detection on the remaining N-M PDCCH monitoring occasions is completed PDCCH monitoring occasion.

In a possible design, the processing module 720 is specifically configured to determine, according to a preset mapping rule, the M PDCCH monitoring occasions from the N PDCCH monitoring occasions, where the preset mapping rule is used to determine PDCCH monitoring occasion whether to detect the WUS on each of the N PDCCH monitoring occasions.

In a possible design, the mapping rule satisfies the following relationship:

$f=(UE_{id}-\text{index})\mod(X)$ where $UE_{id}$ is an identifier of the communications apparatus or a terminal device group to which the communications apparatus belongs, index is a sequence number of the PDCCH monitoring occasion, mod indicates a modulo operation, X is a detection interval, and f is a real number; and when a value of f is 0, it indicates that the transceiver module 710 needs to detect the WUS on the PDCCH monitoring occasion, or when a value of f is not 0, it indicates that the transceiver module 710 does not need to detect the WUS on the PDCCH monitoring occasion.

In a possible design, the transceiver module 710 is further configured to receive first indication information from a network device, where the first indication information is used to indicate to detect the WUS on M of the N PDCCH monitoring occasions.

In a possible design, the N PDCCH monitoring occasions are N PDCCH monitoring occasions in a receive time window of the WUS. The processing module 720 may determine the receive time window of the WUS in the following manner: determining the receive time window based on an offset between an end time of the receive time window and a start time of the DRX ON and a length of the receive time window; or determining the receive time window based on an offset between an end time of the receive time window and a start time of the DRX ON and an offset between a start time of the receive time window and the start time of the DRX ON.

In a possible design, the processing module 720 may determine the N PDCCH monitoring occasions included in the receive time window in the following manner: determining, based on the receive time window and a configuration parameter of the PDCCH monitoring occasion, the N PDCCH monitoring occasions included in the receive time window. The configuration parameter of the PDCCH monitoring occasion is used to indicate one or more of the following information: a sending cycle of a search space set, a start slot for sending the PDCCH monitoring occasion in a sending cycle of each search space set, a quantity of slots for consecutively sending the PDCCH monitoring occasion in the sending cycle of each search space set, a start symbol for sending the PDCCH monitoring occasion in each slot for sending the PDCCH monitoring occasion, or a quantity of symbols for consecutively sending the PDCCH monitoring occasion in each slot for sending the PDCCH monitoring occasion.

The processing module 720 in the communications apparatus may be implemented by a processor or a processor-related circuit component, and the transceiver module 710 may be implemented by a transceiver or a transceiver-related circuit component. Operations and/or functions of the modules in the communications apparatus are separately used to implement corresponding procedures of the method shown in FIG. 2. For brevity, details are not described herein again.

Figure 8:
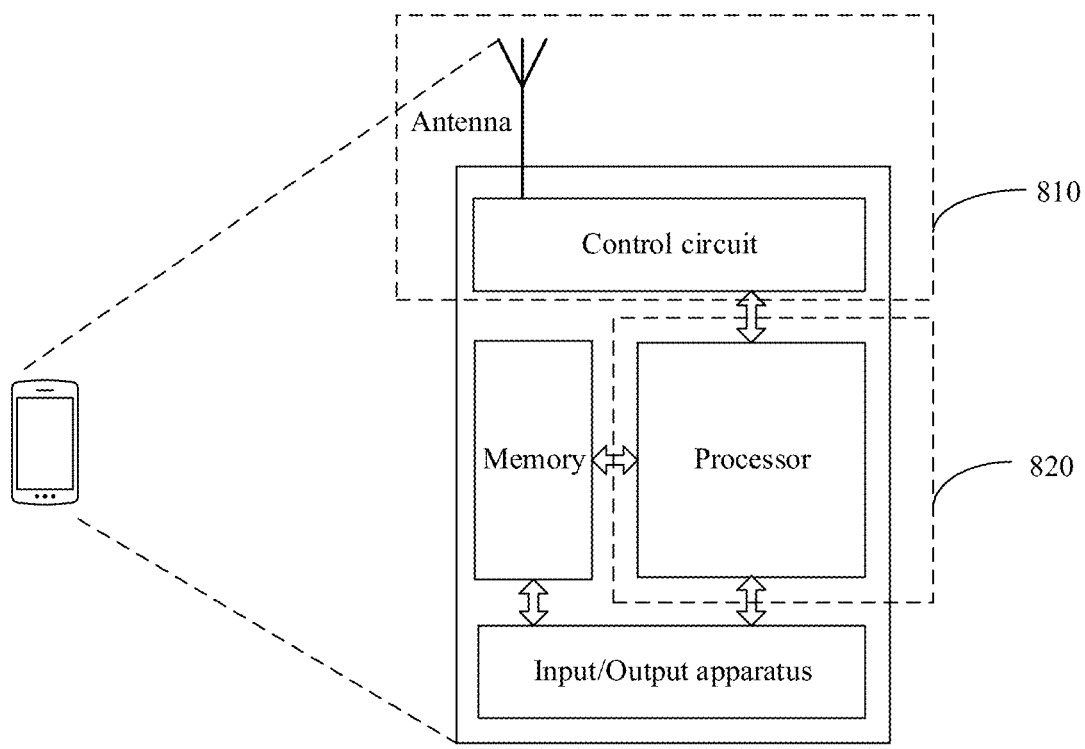
FIG. 8 is another schematic structural diagram of a communications apparatus according to an embodiment of this application.

FIG. 8 is another schematic structural diagram of a communications apparatus according to an embodiment of this application. The communications apparatus may be specifically a terminal device. For ease of understanding and illustration, in FIG. 8, a mobile phone is used as an example of the terminal device. As shown in FIG. 8, the terminal device includes a processor, and may further include a memory. In addition, the terminal device may further include a radio frequency circuit, an antenna, an input/output apparatus, and the like. The processor is mainly configured to: process a communications protocol and communication data, control the terminal device, execute a software program, process data of the software program, and the like. The memory is mainly configured to store the software program and the data. The radio frequency circuit is mainly configured to: perform conversion between a baseband signal and a radio frequency signal, and process the radio frequency signal. The antenna is mainly configured to receive and transmit a radio frequency signal in an electromagnetic wave form. The input/output apparatus, such as a touchscreen, a display screen, and a keyboard, is mainly configured to receive data input by a user and output data to the user. It should be noted that some types of terminal devices may not have the input/output apparatus.

When data needs to be sent, after performing baseband processing on the to-be-sent data, the processor outputs a baseband signal to the radio frequency circuit. After performing radio frequency processing on the baseband signal, the radio frequency circuit sends the radio frequency signal in an electromagnetic wave form through the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 8 shows only one memory and only one processor. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have receiving and sending functions may be considered as a transceiver unit of the terminal device, and the processor that has a processing function may be considered as a processing unit of the terminal device. As shown in FIG. 8, the terminal device includes a transceiver unit 810 and a processing unit 820. The transceiver unit may also be referred to as a transceiver, a transceiver machine, a transceiver apparatus, or the like. The processing unit may also be referred to as a processor, a processing board, a processing module, a processing apparatus, or the like. Optionally, a component that is in the transceiver unit 810 and that is configured to implement a receiving function may be considered as a receiving unit, and a component that is in the transceiver unit 810 and that is configured to implement a sending function may be considered as a sending unit. In other words, the transceiver unit 810 includes the receiving unit and the sending unit. The transceiver unit sometimes may also be referred to as a transceiver machine, a transceiver, a transceiver circuit, or the like. The receiving unit may also be sometimes referred to as a receiver, a receiver, a receiver circuit, or the like. The sending unit may also be sometimes referred to as a transmitter, a transmitter, a transmitter circuit, or the like. It should be understood that the transceiver unit 810 is configured to perform a sending operation and a receiving operation on a terminal device side in the foregoing method embodiments, and the processing unit 820 is configured to perform an operation other than the receiving/sending operation of the terminal device in the foregoing method embodiments.

Figure 9:
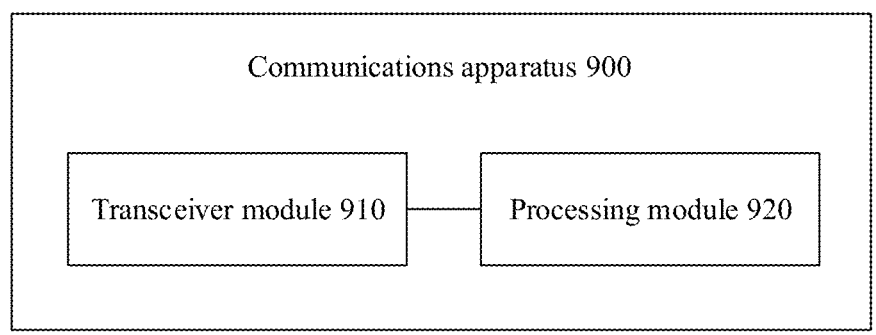
FIG. 9 is a schematic structural diagram of another communications apparatus according to an embodiment of this application.

An embodiment of this application provides another communications apparatus. FIG. 9 is a schematic structural diagram of a communications apparatus according to an embodiment of this application. The communications apparatus 900 includes a transceiver module 910 and a processing module 920. The communications apparatus may be configured to implement a function of the network device in any one of the foregoing method embodiments. For example, the communications apparatus may be a network device or a chip included in a network device.

When the communications apparatus serves as a network device and performs the method embodiment shown in FIG. 2, the processing module 920 is configured to determine N physical downlink control channel PDCCH monitoring occasions before an active time DRX ON, and the transceiver module 910 is configured to send first indication information to a terminal device, where the first indication information is used to indicate the terminal device to detect a wake-up signal WUS on M of the N PDCCH monitoring occasions, where M is less than N, and both N and M are positive integers greater than 1.

In a possible design, the M PDCCH monitoring occasions are M PDCCH monitoring occasions closest to the DRX ON in the N PDCCH monitoring occasions; or the M PDCCH monitoring occasions are M PDCCH monitoring occasions farthest from the DRX ON in the N PDCCH monitoring occasions.

In a possible design, the processing module 920 is further configured to determine, according to a preset mapping rule, the M PDCCH monitoring occasions from the N PDCCH monitoring occasions, where the preset mapping rule is used to determine PDCCH monitoring occasion whether the terminal device needs to detect the WUS on each of the N PDCCH monitoring occasions.

In a possible design, the mapping rule satisfies the following relationship:

$$f=(UE_{id}-\text{index})\mod(X)$$

where $UE_{id}$ is an identifier of the terminal device or a terminal device group, index is a sequence number of the PDCCH monitoring occasion, mod indicates a modulo operation, X is a detection interval, and f is a real number; and when a value of f is 0, it indicates that the terminal device needs to detect the WUS on the PDCCH monitoring occasion, or when a value of f is not 0, it indicates that the terminal device does not need to detect the WUS on the PDCCH monitoring occasion.

In a possible design, the transceiver module 910 is further configured to send second indication information to the terminal device, where the second indication information is used to indicate a configuration parameter of a receive time window of the WUS. The configuration parameter of the receive time window includes an offset between an end time of the receive time window and a start time of the DRX ON and a length of the receive time window, or the configuration parameter of the receive time window includes an offset between an end time of the receive time window and a start time of the DRX ON and an offset between a start time of the receive time window and the start time of the DRX ON.

In a possible design, the transceiver module 910 is further configured to send third indication information to the terminal device, where the third indication information is used to indicate a configuration parameter of the PDCCH monitoring occasion, and the configuration parameter of the PDCCH monitoring occasion includes one or more of the following information: a sending cycle of a search space set, a start slot for sending the PDCCH monitoring occasion in a sending cycle of each search space set, a quantity of slots for consecutively sending the PDCCH monitoring occasion in the sending cycle of each search space set, a start symbol for sending the PDCCH monitoring occasion in each slot for sending the PDCCH monitoring occasion, or a quantity of symbols for consecutively sending the PDCCH monitoring occasion in each slot for sending the PDCCH monitoring occasion.

It should be understood that the processing module 920 in the communications apparatus may be implemented by a processor or a processor-related circuit component, and the transceiver module 910 may be implemented by a transceiver or a transceiver-related circuit component. Operations and/or functions of the modules in the communications apparatus are separately used to implement corresponding procedures of the method shown in FIG. 2. For brevity, details are not described herein again.

Figure 10:
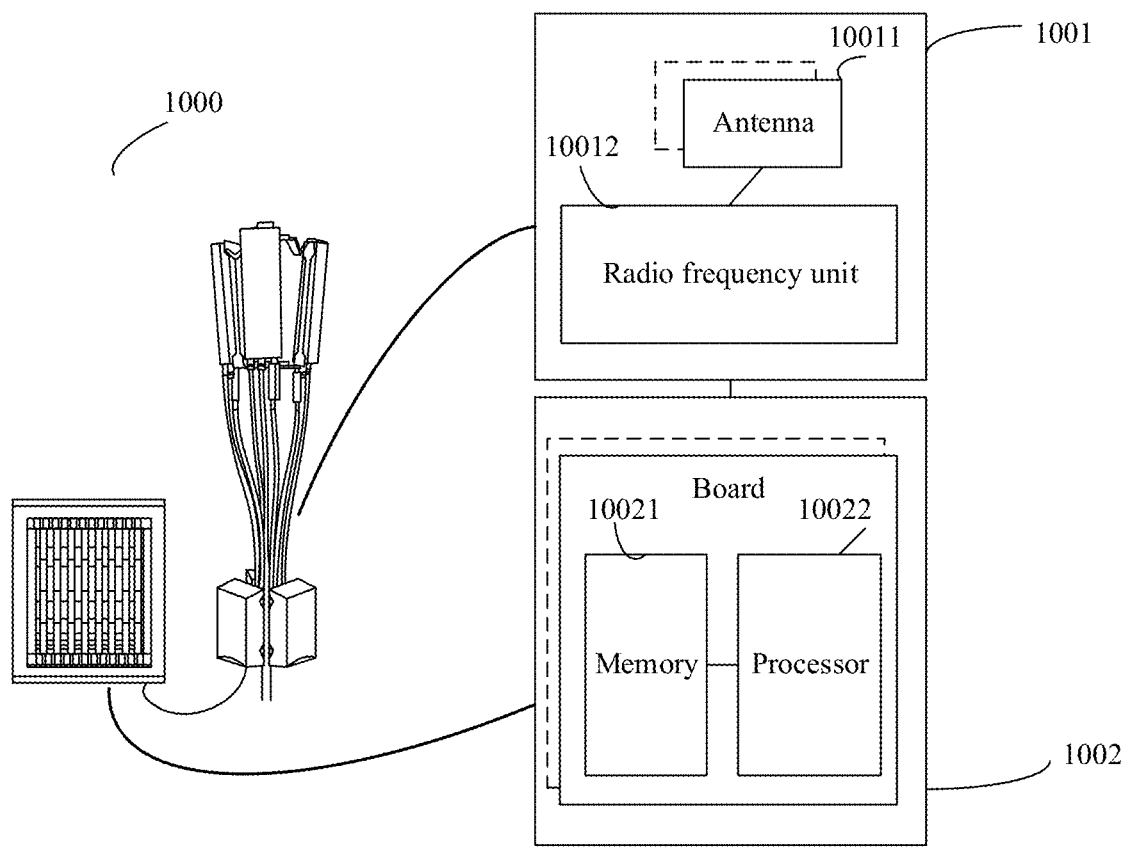
FIG. 10 is another schematic structural diagram of another communications apparatus according to an embodiment of this application.

FIG. 10 is another schematic structural diagram of a communications apparatus according to an embodiment of this application. The communications apparatus may be specifically a network device, for example, a base station, configured to implement a function of the network device in any one of the foregoing method embodiments.

The network device includes one or more radio frequency units, for example, a remote radio unit (remote radio unit, RRU) 1001 and one or more baseband units (baseband unit, BBU) (which may also be referred to as a digital unit (digital unit, DU)) 1002. The RRU 1001 may be referred to as a transceiver unit, a transceiver machine, a transceiver circuit, a transceiver, or the like, and may include at least one antenna 10011 and a radio frequency unit 10012. The RRU 1001 is mainly configured to receive and send a radio frequency signal and convert the radio frequency signal and a baseband signal. The BBU 1002 is mainly configured to perform baseband processing, control the base station, and the like. The RRU 1001 and the BBU 1002 may be physically disposed together, or may be physically disposed separately, namely, a distributed base station.

The BBU 1002 is a control center of the base station, may also be referred to as a processing unit, and is mainly configured to complete baseband processing functions such as channel coding, multiplexing, modulation, and spectrum spreading. For example, the BBU (the processing unit) 1002 may be configured to control the base station to perform an operation procedure related to the network device in the foregoing method embodiments.

In an example, the BBU 1002 may include one or more boards, and a plurality of boards may jointly support a radio access network (for example, an LTE network) having a single access technology, or may separately support radio access networks (for example, an LTE network, a 5G network, or another network) having different access standards. The BBU 1002 may further include a memory 10021 and a processor 10022, and the memory 10021 is configured to store a necessary instruction and necessary data. The processor 10022 is configured to control the base station to perform a necessary action, for example, is configured to control the base station to perform a sending operation in the foregoing method embodiments. The memory 10021 and the processor 10022 may serve one or more boards. In other words, a memory and a processor may be disposed on each board. Alternatively, a plurality of boards may share a same memory and a same processor. In addition, each board may further be provided with a necessary circuit.

An embodiment of this application further provides a chip system, including a processor. The processor is coupled to a memory, the memory is configured to store a program or an instruction, and when the program or the instruction is executed by the processor, the chip system is enabled to implement the method in any one of the foregoing method embodiments.

Optionally, there may be one or more processors in the chip system. The processor may be implemented by using hardware, or may be implemented by using hardware. When the processor is implemented by using hardware, the processor may be a logic circuit, an integrated circuit, or the like. When the processor is implemented by using software, the processor may be a general-purpose processor, and is implemented by reading software code stored in the memory.

Optionally, there may be one or more memories in the chip system. The memory may be integrated with the processor, or may be disposed separately from the processor. This is not limited in this application. For example, the memory may be a non-transitory processor, for example, a read-only memory ROM. The memory and the processor may be integrated into a same chip, or may be separately disposed on different chips. A type of the memory and a manner of disposing the memory and the processor are not specifically limited in this application.

For example, the chip system may be a field programmable gate array (field programmable gate array, FPGA), or an application-specific integrated chip (application-specific integrated circuit, ASIC), or may be a system on chip (system on chip, SoC), a central processing unit (central processor unit, CPU), a network processor (network processor, NP), a digital signal processor (digital signal processor, DSP), or a micro controller (micro controller unit, MCU), or may be a programmable logic device (programmable logic device, PLD), or another integrated chip.

It should be understood that steps in the foregoing method embodiments may be implemented by using a hardware integrated logical circuit in the processor or an instruction in a form of software. The steps of the method disclosed with reference to the embodiments of this application may be directly performed by a hardware processor, or may be performed by using a combination of hardware in the processor and a software module.

An embodiment of this application further provides a computer-readable storage medium. The computer storage medium stores a computer-readable instruction. When a computer reads and executes the computer-readable instruction, the computer is enabled to perform the method in any one of the foregoing method embodiments.

An embodiment of this application further provides a computer program product. When a computer reads and executes the computer program product, the computer is enabled to perform the method in any one of the foregoing method embodiments.

An embodiment of this application further provides a communications system. The communications system includes a network device and at least one terminal device described in the foregoing method embodiments.

It should be understood that, the processor mentioned in the embodiments of this application may be a central processing unit (central processing unit, CPU), and may further be another general purpose processor, a digital signal processor (digital signal processor, DSP), an application-specific integrated circuit (application-specific integrated circuit, ASIC), a field programmable gate array (field programmable gate array, FPGA) or another programmable logic device, a discrete gate or a transistor logic device, a discrete hardware component, or the like. The general purpose processor may be a microprocessor, or the processor may be any conventional processor or the like.

It should be further understood that the memory mentioned in the embodiments of this application may be a volatile memory or a nonvolatile memory, or may include both a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It should be noted that when the processor is a general purpose processor, a DSP, an ASIC, an FPGA or another programmable logic device, a discrete gate or a transistor logic device, or a discrete hardware component, the memory (a storage module) is integrated into the processor.

It should be noted that the memory described in this specification aims to include but is not limited to these memories and any memory of another proper type.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware.

Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A wake-up signal detection method, wherein the wake-up signal detection method comprises:

determining, by a terminal device, N physical downlink control channel (PDCCH) monitoring occasions before an active time (DRX ON); and monitoring, by the terminal device, for a wake-up signal (WUS) on M PDCCH monitoring occasions of the N PDCCH monitoring occasions, wherein the M PDCCH monitoring occasions are M PDCCH monitoring occasions farthest from the DRX ON in the N PDCCH monitoring occasions, and wherein M is less than N, and both N and M are positive integers greater than 1.

2. The wake-up signal detection method according to claim 1, wherein the N PDCCH monitoring occasions are located in a receive time window of the WUS, the wake-up signal detection method further comprises:

determine the receive time window based on an offset between an end time of the receive time window and a start time of the DRX ON and an offset between a start time of the receive time window and the start time of the DRX ON.

3. The wake-up signal detection method according to claim 1, wherein the wake-up signal detection method further comprises:

in response to determining that the WUS is not detected on the M PDCCH monitoring occasions, continuing, by the terminal device, to monitor for the WUS on remaining N-M PDCCH monitoring occasions until the WUS is detected or detection on the remaining N-M PDCCH monitoring occasions is completed.

4. The wake-up signal detection method according to claim 1, wherein the wake-up signal detection method further comprises:

determining, by the terminal device according to a preset mapping rule, the M PDCCH monitoring occasions from the N PDCCH monitoring occasions, wherein the preset mapping rule is used to determine whether to monitor for the WUS on each of the N PDCCH monitoring occasions.

5. The wake-up signal detection method according to claim 4, wherein the preset mapping rule satisfies the following relationship:

$$f=(UE_{id}\text{-index})\bmod (X)$$

wherein:
UE$_{id}$ is an identifier of the terminal device or a terminal device group to which the terminal device belongs, index is a sequence number of a PDCCH monitoring occasion, mod indicates a modulo operation, X is a detection interval, and f is a real number; and when a value of f is 0, it indicates that the terminal device needs to monitor for the WUS on the PDCCH monitoring occasion, or when a value of f is not 0, it indicates that the terminal device does not need to monitor for the WUS on the PDCCH monitoring occasion.

6. The wake-up signal detection method according to claim 1, wherein the wake-up signal detection method further comprises:

receiving, by the terminal device, first indication information from a network device, wherein the first indication information is used to indicate to the terminal device to monitor for the WUS on the M PDCCH monitoring occasions of the N PDCCH monitoring occasions.

7. An apparatus, comprising:
at least one processor; and one or more memories coupled to the at least one processor and storing program instructions for execution by the at least one processor to:

determine, by a terminal device, N physical downlink control channel (PDCCH) monitoring occasions before an active time (DRX ON); and monitor, by the terminal device, for a wake-up signal (WUS) on M PDCCH monitoring occasions of the N PDCCH monitoring occasions, wherein the M PDCCH monitoring occasions are M PDCCH monitoring occasions farthest from the DRX ON in the N PDCCH monitoring occasions, and wherein M is less than N, and both N and M are positive integers greater than 1.

8. The apparatus according to claim 7, wherein the N PDCCH monitoring occasions are located in a receive time window of the WUS, and the one or more memories store the program instructions for execution by the at least one processor to:

determine the receive time window based on an offset between an end time of the receive time window and a start time of the DRX ON and an offset between a start time of the receive time window and the start time of the DRX ON.

9. The apparatus according to claim 7, wherein the one or more memories store the program instructions for execution by the at least one processor to:

in response to determining that the WUS is not detected on the M PDCCH monitoring occasions, continue, by the terminal device, to monitor for the WUS on remaining N-M PDCCH monitoring occasions until the WUS is detected or detection on the remaining N-M PDCCH monitoring occasions is completed.

10. The apparatus according to claim 7, wherein the one or more memories store the program instructions for execution by the at least one processor to:

determine, by the terminal device according to a preset mapping rule, the M PDCCH monitoring occasions from the N PDCCH monitoring occasions, wherein the preset mapping rule is used to determine whether to monitor for the WUS on each of the N PDCCH monitoring occasions.

11. The apparatus according to claim 10, wherein the preset mapping rule satisfies the following relationship:

$$f=(UE_{id}-\text{index}) \bmod(X)$$

wherein:

$UE_{id}$ is an identifier of the terminal device or a terminal device group to which the terminal device belongs, index is a sequence number of a PDCCH monitoring occasion, mod indicates a modulo operation, X is a detection interval, and f is a real number; and when a value of f is 0, it indicates that the terminal device needs to monitor for the WUS on the PDCCH monitoring occasion, or when a value of f is not 0, it indicates that the terminal device does not need to monitor for the WUS on the PDCCH monitoring occasion.

12. The apparatus according to claim 7, wherein the one or more memories store the program instructions for execution by the at least one processor to:

receive, by the terminal device, first indication information from a network device, wherein the first indication information is used to indicate to the terminal device to monitor for the WUS on the M PDCCH monitoring occasions of the N PDCCH monitoring occasions.

13. An apparatus, comprising:

at least one processor; and one or more memories coupled to the at least one processor and storing program instructions for execution by the at least one processor to:

determine, by a network device, N physical downlink control channel (PDCCH) monitoring occasions before an active time (DRX ON); and send, by the network device, first indication information to a terminal device, wherein the first indication information is used to indicate to the terminal device to monitor for a wake-up signal (WUS) on M PDCCH monitoring occasions of the N PDCCH monitoring occasions, wherein M is less than N, and both N and M are positive integers greater than 1.

14. The apparatus according to claim 13, wherein:

the M PDCCH monitoring occasions are M PDCCH monitoring occasions closest to the DRX ON; or the M PDCCH monitoring occasions are M PDCCH monitoring occasions farthest from the DRX ON.

15. The apparatus according to claim 13, wherein the N PDCCH monitoring occasions are located in a receive time window of the WUS, and the one or more memories store the program instructions for execution by the at least one processor to:

determine the receive time window based on an offset between an end time of the receive time window and a start time of the DRX ON and an offset between a start time of the receive time window and the start time of the DRX ON.

16. The apparatus according to claim 13, wherein the one or more memories store the program instructions for execution by the at least one processor to:

determine, by the network device according to a preset mapping rule, the M PDCCH monitoring occasions from the N PDCCH monitoring occasions, wherein the preset mapping rule is used to determine whether the terminal device needs to monitor for the WUS on each of the N PDCCH monitoring occasions.

17. The apparatus according to claim 16, wherein the preset mapping rule satisfies the following relationship:

$$f=(UE_{id}-\text{index}) \bmod(X)$$

wherein:

$UE_{id}$ is an identifier of the terminal device or a terminal device group to which the terminal device belongs, index is a sequence number of the PDCCH monitoring occasion, mod indicates a modulo operation, X is a detection interval, and f is a real number; and when a value of f is 0, it indicates that the terminal device needs to monitor for the WUS on the PDCCH monitoring occasion, or when a value of f is not 0, it indicates that the terminal device does not need to monitor for the WUS on the PDCCH monitoring occasion.

* * * * *